United States Patent [19]

(12) United States Patent
Janssen et al.

(10) Patent No.: US 8,055,826 B2
(45) Date of Patent: *Nov. 8, 2011

(54) COMMUNICATION SYSTEM AND METHOD FOR OPERATION THEREOF

(75) Inventors: Dirk Janssen, Verl (DE); Franz-Josef Kucharski, Gütersloh (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/911,173

(22) PCT Filed: Apr. 1, 2006

(86) PCT No.: PCT/EP2006/002990
§ 371 (c)(1),
(2), (4) Date: Aug. 5, 2008

(87) PCT Pub. No.: WO2006/108527
PCT Pub. Date: Oct. 19, 2006

(65) Prior Publication Data
US 2009/0222606 A1 Sep. 3, 2009

(30) Foreign Application Priority Data

Apr. 11, 2005 (DE) .......................... 10 2005 016 596

(51) Int. Cl.
G06F 13/00 (2006.01)
G06F 15/173 (2006.01)
H04L 12/42 (2006.01)
H04L 12/437 (2006.01)

(52) U.S. Cl. .................. 710/110; 710/306; 709/251

(58) Field of Classification Search .................. 710/110
See application file for complete search history.

(56) References Cited

U.S. PATENT DOCUMENTS

| 4,527,270 | A | | 7/1985 | Sweeton et al. |
|---|---|---|---|---|
| 4,745,597 | A | * | 5/1988 | Morgan et al. ................. 370/224 |
| 6,005,869 | A | * | 12/1999 | Sakai et al. .................... 370/452 |
| 6,157,651 | A | * | 12/2000 | Meares et al. ................. 370/403 |
| 7,065,039 | B2 | * | 6/2006 | Ying ............................. 370/222 |
| 7,085,496 | B2 | * | 8/2006 | Kinoshita et al. ............... 398/83 |
| 7,283,740 | B2 | * | 10/2007 | Kinoshita et al. ................. 398/5 |
| 2004/0008719 | A1 | * | 1/2004 | Ying ............................. 370/460 |

(Continued)

FOREIGN PATENT DOCUMENTS

DE 19511178 A1 10/1996

(Continued)

*Primary Examiner* — Ryan Stiglic
(74) *Attorney, Agent, or Firm* — Dorsey & Whitney LLP

(57) ABSTRACT

A communication system comprises a multiplicity of slave units and a master unit. The slave units are coupled to one another via a first communication path and a second communication path, the first communication path and the second communication path operating in opposite directions to one another, and a master unit, the master unit being coupled to the multiplicity of slave units via the first communication path and the second communication path. The master unit comprises a transmit control unit, the transmit control unit separately transmitting an information signal with a data field which has for each slave unit an associated data area, on the first communication path as a first information signal and on the second communication path as a second information signal. The master unit further comprises a receive control unit, the receive control unit superimposing the data field of the first information signal circulated on the first communication path and the data field of the second information signal circulated on the second communication path.

27 Claims, 4 Drawing Sheets

U.S. PATENT DOCUMENTS

| | | | |
|---|---|---|---|
| 2004/0008721 A1* | 1/2004 | Ying et al. | 370/460 |
| 2004/0177203 A1* | 9/2004 | Goodnow et al. | 710/305 |
| 2004/0208575 A1* | 10/2004 | Kinoshita et al. | 398/83 |
| 2004/0208576 A1* | 10/2004 | Kinoshita et al. | 398/83 |
| 2005/0088982 A1* | 4/2005 | Ying | 370/294 |
| 2005/0129037 A1* | 6/2005 | Zumsteg et al. | 370/404 |
| 2006/0092858 A1* | 5/2006 | Kynast et al. | 370/254 |
| 2006/0114943 A1* | 6/2006 | Kynast et al. | 370/509 |
| 2006/0136604 A1* | 6/2006 | Schultze et al. | 709/251 |
| 2007/0143510 A1* | 6/2007 | Schultze | 710/100 |
| 2007/0183319 A1* | 8/2007 | Rug et al. | 370/228 |
| 2007/0192449 A1* | 8/2007 | Schultze et al. | 709/220 |
| 2007/0274208 A1* | 11/2007 | Harter et al. | 370/223 |
| 2008/0170495 A1* | 7/2008 | Monse et al. | 370/223 |

FOREIGN PATENT DOCUMENTS

| | | |
|---|---|---|
| DE | 19726763 A1 | 1/1999 |
| DE | 10312907 A1 | 10/2004 |
| EP | 0587898 A1 | 3/1994 |
| EP | 0605795 A1 | 7/1994 |
| EP | 0973301 A1 | 1/2000 |
| EP | 1271854 A2 | 1/2003 |
| GB | 2348782 A1 | 10/2000 |
| JP | 11-68805 | 8/1977 |
| JP | 8-88643 | 11/1977 |
| JP | 57173245 | 10/1982 |
| JP | 61154332 | 7/1986 |

* cited by examiner

COMMUNICATION SYSTEM AND METHOD FOR OPERATION THEREOF

CROSS-REFERENCE TO RELATED APPLICATION

This Application is a Section 371 National Stage Application of International Application No. PCT/EP2006/002990, filed 1 Apr. 2006 and published as WO 2006/108527 A1 on 19 Oct. 2006, which claims the priority from the German application 10 2005 016 596.6, filed

BACKGROUND

The invention relates to a communication system, a master unit, a user unit, a method of operating a communication system and a method of operating a user unit.

In production and automation technology, serial bus systems are increasingly used in which the remotely arranged devices of machine peripherals such as I/O modules, transducers, drives, valves and operator terminals communicate with automation, engineering or visual display systems via an efficient real-time communication system. In this arrangement, all users are networked together via a serial bus, preferably via a field bus, the data exchange via the bus being carried out, as a rule, on the basis of the master-slave principle.

The active bus users on the bus system, the control devices, as a rule, possess a bus access authorization and determine the data transfer on the bus. The active bus users are called the master units in the serial bus system. In contrast, passive bus users are, as a rule, machine peripheral devices. They do not receive a bus access authorization, i.e. they are only allowed to acknowledge received information signals or transfer information signals to a master unit on request by the latter. Passive bus users are called slave units in the serial bus system.

To avoid complex cabling, field bus systems having a master-slave structure are generally arranged in ring topology, all bus users being coupled to a ring-shaped transmission path. An information signal generated by the master unit is fed into the ring-shaped transmission path by the master unit and successively passes through the slave units serially coupled to the ring-shaped transmission path and is then received again by the master unit and evaluated. Master-slave systems can also be designed as multi-master systems.

As a rule, the information signals are organized by the master unit into data packets which are composed of control data and useful data, preferably using the Ethernet standard which provides for data packets having a length of up to 1500 bytes with a transmission speed which, at the same time, is high at 100 Mbit/sec. Each of the slave units coupled to the ring-shaped transmission path exchanges the useful data intended for it with the Ethernet message when the Ethernet message fed in by the master unit passes through on the ring-shaped transmission path.

As a rule, the master-slave communication systems with ring structure are configured in such a manner that the master unit has a transmitting unit as data injection point and a receiving unit as data extraction point into a transmission medium. The individual slave units are then coupled together on the transmission path to form a chain, wherein each user is coupled to two neighbors and the first and last user in the chain is coupled to the master unit. The data packets are transmitted in one direction starting from the master unit via its transmitting unit to the first slave unit coupled and from there to the next one, until the last slave unit in the chain is reached, and then back to the receiving unit of the master unit. Each slave unit has, for receiving the circulating data packets from the previous user, an interface with a receiving unit and, for forwarding to the following user, an interface with a transmitting unit, a processing unit being arranged between receiving and transmitting unit in order to process the data packets passing through the slave unit, i.e. to exchange the useful data allocated to the slave unit with the data packets. The ring-shaped communication system with master-slave structure is often designed in such a manner that the master unit forms a physical line with the slave units arranged at it, the transmission medium having a dual-line structure and each slave unit having two ports with a combined transmitting/receiving unit, transmitting and receiving unit being short-circuited in the output port of the last slave unit in the transmission chain. The data packets injected into the first line by the master unit via its receiving unit are processed by the slave units on the forward path and are then simply forwarded only to the receiving unit of the master unit on the return path via the second line.

A central requirement for master-slave communication systems, particularly when they are used in production and process automation, is a high fault tolerance, that is to say the capability of the communication system to maintain the required function, i.e., for example, the production of a workpiece, in spite of the occurrence of faults. In this context, faults in the communication system which must be overcome without impairment of the process are, in addition to faults in the data packets, also the failure of entire transmission links, in particular, for example due to physical separation of the transmission medium.

To achieve a fault-tolerant master-slave communication system, particularly in the case of link faults, i.e. in the case of the failure of entire transmission sections, dual-ring structures operating in opposite directions are frequently used. Thus, a communication system having a master-slave structure in which the master unit is serially coupled to a multiplicity of slave units via two communication paths operating in opposite directions, is described in U.S. Pat. No. 4,663,748, wherein the master unit simultaneously sends out the data packets over two communication paths. The slave unit then has two processing units which are in each case coupled between the two communication paths in order to process the data messages passing through. Furthermore, coupling units which can be activated are arranged in the users, so that when a link fault occurs, e.g. a break in a communication line, it reconfigures the communication system by monitoring the signals on both transmission rings and correspondingly switching over the communication system, in such a manner that a failure due to the link fault of a greater section of the communication system or even a total failure is prevented.

In DE 103 12 907 A1, it is also proposed to arrange the slave unit in such a manner that on each communication path in the direction of data transmission, first a processing unit and then a multiplexer having two inputs and one output is arranged. The multiplexer is coupled with its inputs in each case to the two processing units of the slave unit and coupled with its output to the associated communication path. In fault-free normal operation, each of the two multiplexers switches through the processing unit arranged on the associated communication path. In fault mode, when a link fault occurs on the associated communication path, however, the processing unit on the other communication path is then switched through. This design of the slave unit enables the communication system to be reconfigured essentially in real time in the fault case.

However, fault-tolerant master-slave communication systems having a dual-ring structure, in which the individual slave units in each case have two processing units for processing the data message passing through, provide for high hardware and switching complexity of the slave units and thus increase the cost. Furthermore, each slave unit must decide in normal operation which of the two data packets passing through the two processing units should be used for device control which greatly restricts the use of such communication systems at the required high data transmission rates. In addition, the known fault-tolerant communication systems with dual-ring topology require that the master unit responds separately to a link fault and switches from normal operation into fault operating mode.

SUMMARY

There is a need for improvement of a communication system, a master unit, a user unit, a method of operating a communication system and a method of operating a user unit.

According to an embodiment a communication system comprises a multiplicity of slave units and a master unit. The slave units are coupled to one another via a first communication path and a second communication path, the first communication path and the second communication path operating in opposite directions to one another, and a master unit, the master unit being coupled to the multiplicity of slave units via the first communication path and the second communication path. The master unit comprises a transmit control unit, the transmit control unit separately transmitting an information signal with a data field which has for each slave unit an associated data area, on the first communication path as a first information signal and on the second communication path as a second information signal. The master unit further comprises a receive control unit, the receive control unit superimposing the data field of the first information signal circulated on the first communication path and the data field of the second information signal circulated on the second communication path.

According to a further embodiment a master unit is coupled to a first communication path and a second communication path, the first communication path and the second communication path operating in opposite directions to one another. The master unit comprises a transmit control unit, the transmit control unit separately transmitting an information signal with a data field on the first communication path as a first information signal and on the second communication path as a second information signal. The master unit further comprises a receive control unit, the receive control unit superimposing the data field of the first information signal circulated on the first communication path and the data field of the second information signal circulated on the second communication path.

According to a further embodiment a user unit comprises a first receiving unit, the first receiving unit being coupled to a first communication path and receiving information signals on the first communication path, a first transmitting unit, the first transmitting unit being coupled to the first communication path and transmitting information signals on the first communication path, a second receiving unit, the second receiving unit being coupled to a second communication path and receiving information signals on the second communication path, a second transmitting unit, the second transmitting unit being coupled to the second communication path and transmitting information signals on the second communication path, a processing unit, the processing unit comprising an input and an output and processing information signals, and a coupling device. The coupling device, in normal mode, connects the input of the processing unit to the first receiving unit, the output of the processing unit to the first transmitting unit and the second receiving unit to the second transmitting unit. The coupling device, in fault mode of the first transmitting unit and/or of the second receiving unit, connects the input of the processing unit to the first receiving unit and the output of the processing unit to the second transmitting unit. The coupling device, in fault mode of the first receiving unit and/or of the second transmitting unit, connects the input of the processing unit to the second receiving unit and the output of the processing unit to the first transmitting unit.

According to a further embodiment a method operates a communication system having a master-slave structure, wherein slave units are coupled serially to a master unit via a dual-ring structure formed by a first communication path and a second communication path, the first communication path and the second communication path operating in opposite directions, wherein the master unit separately transmits an information signal with a data field which has for each slave unit an associated data area, on the first communication path as a first information signal and on the second communication path as a second information signal, and wherein the master unit superimposes the data field of the first information signal circulated on the first communication path and the data field of the second information signal circulated on the second communication path.

According to a further embodiment a method operates a user unit. The user unit comprises a first receiving unit, the first receiving unit being coupled to a first communication path and receiving information signals on the first communication path, a first transmitting unit, the first transmitting unit being coupled to the first communication path and transmitting information signals on the first communication path, a second receiving unit, the second receiving unit being coupled to a second communication path and receiving information signals on the second communication path, a second transmitting unit, the second transmitting unit being coupled to the second communication path and transmitting information signals on the second communication path, and a processing unit, the processing unit comprising an input and an output and processing information signals. In normal mode, the input of the processing unit is connected to the first receiving unit, the output of the processing unit is connected to the first transmitting unit and the second receiving unit is connected to the second transmitting unit. In fault mode of any of the first transmitting unit and the second receiving unit, the input of the processing unit is connected to the first receiving unit and the output of the processing unit to the second transmitting unit. In fault mode of any of the first receiving unit and of the second transmitting unit, the input of the processing unit is connected to the second receiving unit and the output of the processing unit is connected to the first transmitting unit.

BRIEF DESCRIPTION OF THE DRAWINGS

The features of embodiments will become clear from the following description, taking in conjunction with the accompanying drawings. It is to be noted, however, that the accompanying drawings illustrate only typical embodiments and are, therefore, not to be considered limiting of the scope. It may admit other equally effective embodiments.

FIG. 1 shows a diagrammatic representation of a communication system according to an embodiment having a master-slave structure, wherein

DETAILED DESCRIPTION

Figure 1A:
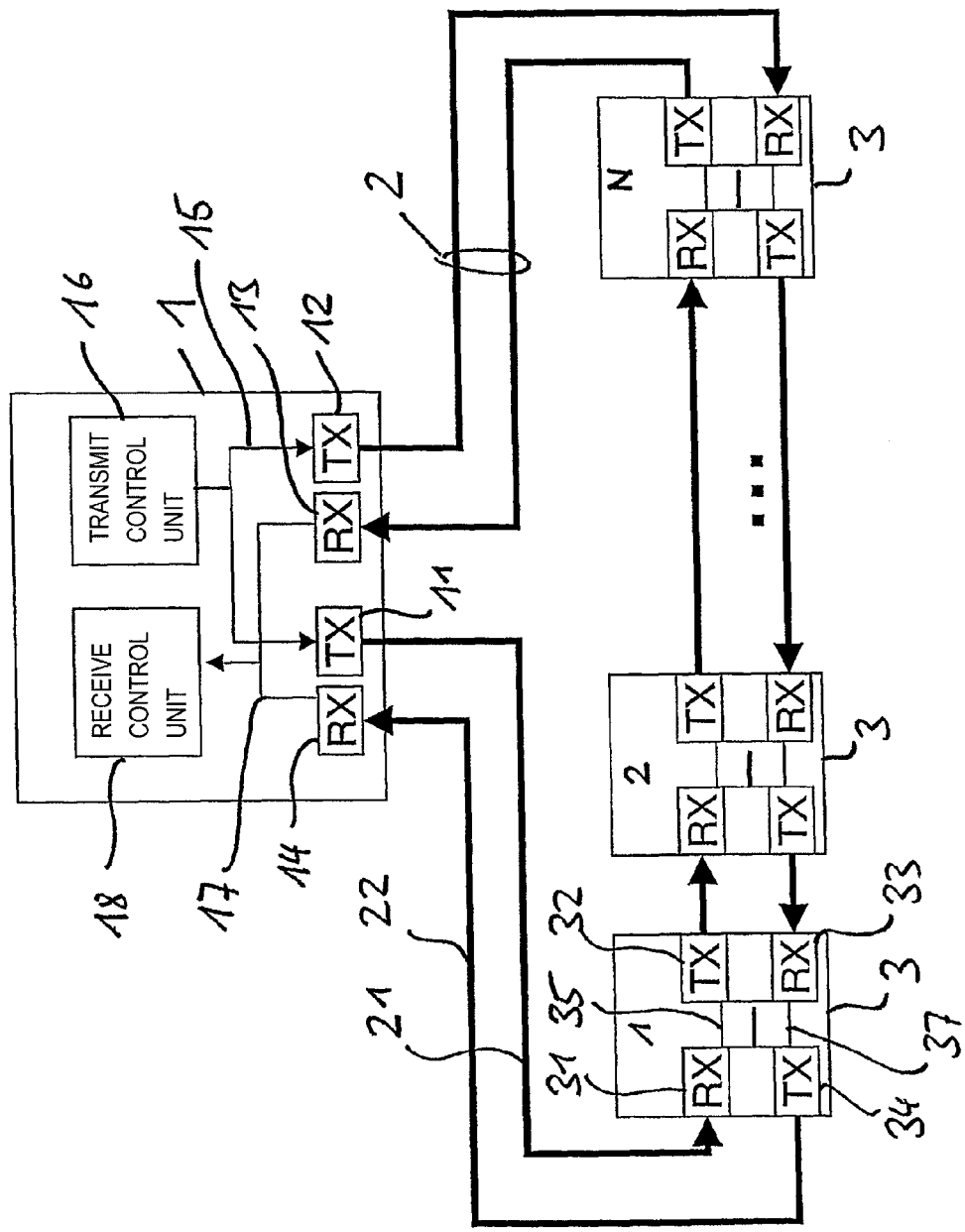
FIG. 1A represents normal mode.

In automation technology, field bus systems are increasingly used in which devices of the machine peripherals, arranged in distributed manner, communicate with automation, engineering and visual display systems via a field bus. As a rule, the field bus system has a serial bus which can be, for example, an electrical line, an optical waveguide or a radio cable. All bus users are then coupled to this field bus, a distinction being made between active bus users and passive bus users. The active bus users on the field bus system are the master units which determine the data traffic on the bus. Such a master unit is, for example, an industrial PC which is used as process control computer in a production process. This master unit has a bus access authorization and can output data to the field bus without external request. The passive bus users on the bus system are peripheral machine devices, for example I/O devices, valves, drives and transducers. They are used as slave units and do not obtain a bus access authorization, i.e. they are only allowed to acknowledge received information signals or to transmit information signals to a master unit on request by the latter.

The communication standard used for data transmission in the master-slave system is preferably the Ethernet concept. In Ethernet communication systems, the data to be transmitted are encapsulated in data packets, also called messages in the further text, having a predetermined format. The Ethernet messages can have a data length of up to 1500 bytes containing, additionally to the useful data, control data which have a start identifier, a destination and source address, the data packet type and a fault mechanism.

Ethernet communication systems having a master-slave structure are preferably designed in such a manner that the individual slave units are coupled together via the transmission medium to form a chain, each slave unit being coupled to two neighbors and the first and the last user in the chain being coupled to the master unit so that a ring structure is obtained. In this arrangement, the data are transmitted in one direction starting from the master unit to the first adjacent slave unit and from there to the next one until the last slave unit and then back to the master unit.

To ensure high fault tolerance, particularly in the case of a link fault in the communication system, i.e. the failure of entire transmission sections with slave units, e.g. due to a cable break, the communication systems having a master-slave structure often have two communication paths which operate in opposite direction to one another. Due to the dual-ring structure operating in opposite directions, the possibility exists in the case of link faults to carry out reconfiguration measures in the communication system in order to maintain the operability of the communication system in spite of link faults.

FIG. 1 shows in a basic circuit diagram such a fault-tolerant communication system in an embodiment. The communication system has a master unit 1 which is coupled serially to N slave units 3 via a dual-ring structure 2. The dual-ring structure comprises two unidirectional communication paths 21, 22 which pass through the coupled slave units 3 in opposite directions. The master unit 1 is coupled to the first communication path 21 as a data extraction point via a first transmitting unit TX11 and to the second communication path 22 as data extraction point via a second transmitting unit TX12. Furthermore, the master unit 1 has a first receiving unit RX13 as data injection point for the first communication path 21 and a second receiving unit RX14 as data injection point for the second communication path 22. The first transmitting unit TX11 and the second transmitting unit TX12 are coupled to a transmit control unit 16 via a first control line 15. The first receiving unit RX13 and the second receiving unit RX14 are coupled via a second control line 17 and to a receive control unit 18.

Each slave unit 3, in turn, has an interface, for receiving messages from a preceding user via the first communication path 21, with a first receiving unit RX31 and an interface with a first transmitting unit TX32 for forwarding to the next user via the first communication path 21. Furthermore, each slave unit 3 has for receiving a circulating Ethernet message via the second communication path 22 from a preceding user an interface with a second receiving unit RX33 and, for forwarding to the following user, an interface with a second transmitting unit TX34. Between the first receiving unit RX31, the second receiving unit RX32, the first transmitting unit TX33 and the second transmitting unit TX34, a processing unit 35 and a coupling device 37 which can be activated, is also coupled in each slave unit 3.

Figure 2:
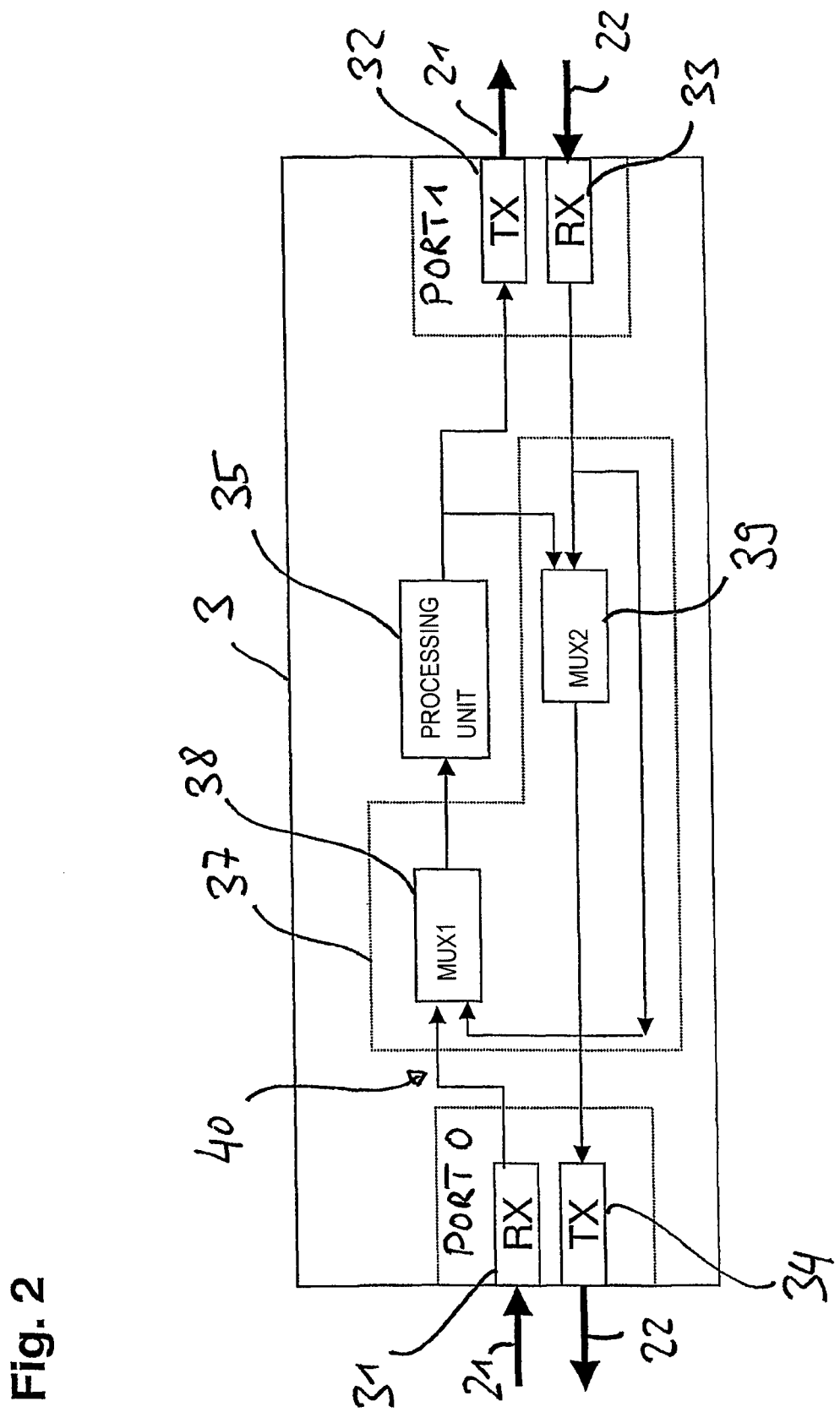
FIG. 2 shows a diagrammatic representation of a user according to an embodiment.

The basic circuit diagram of a slave unit 3 is shown in greater detail in FIG. 2. In the slave unit 3, the first receiving unit RX31 which is coupled to the first communication path 21, and the second transmitting unit TX34 which is coupled to the second communication path 22, are grouped as port 0. The second receiving unit RX33 which is coupled to a second communication path 22, and the first transmitting unit TX32 which is coupled to the first communication path 21, are organized as port 1.

The coupling device 37 which can be activated has a first change-over switch 38 and a second change-over switch 39 which are in each case designed as 2-1 multiplexers. The receiving and transmitting unit 31, 32, 33, 34, the multiplexers 38, 39 of the coupling device 37 which can be activated, and the processing unit 35 are intercoupled in this arrangement in the manner shown by arrows in FIG. 2 by a line network 40.

The output of the first receiving unit RX31 is coupled to the first input of the first multiplexer 38 ("MUX 1"). The second input of the first multiplexer 38 is coupled to the second receiving unit RX33. The output of the first multiplexer 38 is also coupled to the processing unit 35. The second multiplexer 39 ("MUX 2"), in turn, is coupled with its first input to the second receiving unit RX33 and with its second input to the output of the processing unit 35. The output of the second multiplexer 39 is coupled to the second transmitting unit TX34. In addition, the output of the processing unit 35 is also coupled to the first transmitting unit TX32 via the line network 40.

In the case of fault-free normal operation of the communication system as shown in FIG. 1A, the transmit control unit 16 of the master unit transfers to the first transmitting unit TX11 and the second transmitting unit TX12 a message which is then sent by the two transmitting units simultaneously in opposite directions via the first communication path 21 and the second communication path 22. In this process, the messages pass in opposite directions through the coupled slave units 3, all coupling devices 37 which can be activated in the slave units 3 being coupled in such a manner that the input of the processing unit 35 is coupled to the first receiving unit RX31, the output of the processing unit 35 is coupled to the first transmitting unit TX32 and the second receiving unit RX33 is coupled to the second transmitting unit TX34.

In this operating mode of the slave units 3, the coupling device 37 which can be activated ensures that the two identical messages circulating in opposite directions on the first communication path 21 and on the second communication path 22 always pass through the slave unit in such a manner that only the messages transmitted via the first communication path 21 are processed by the processing unit 35. In contrast, the message circulating on the second communication path 22 is only passed through by the slave units 3 and arrives again unprocessed at the master unit 1. The two messages circulating in opposite directions via the first and second communication path 21, 22 are in this case recognized by the first receiving unit RX13 and the second receiving unit RX14 of the master unit 1 and forwarded via the second control line 17 to the receive control unit 18 for evaluation.

The coupling device 37 which can be activated and consists of the two 2-1 multiplexers 38, is controlled in fault-free normal operation in such a manner that of the two identical messages which circulate on the two communication paths 21, 22 simultaneously but in the opposite direction, only the message on the first communication path 21 is conducted through the processing unit 35 of the slave units 3 for processing. The message circulating on the second communication path 22 serves as redundancy and is fed back unchanged to the master unit 1. The communication system comprises a master-slave structure in which the slave units are serially coupled to the master unit via two dual-ring structures which operate in opposite directions, only a single processing unit 35 being provided in each slave unit 3, also has the capability in the fault case, i.e. on the occurrence of a link fault, for reconfiguring the communication paths in the individual slave units in order to thus maintain the operability of the overall communication system.

Figure 1B:
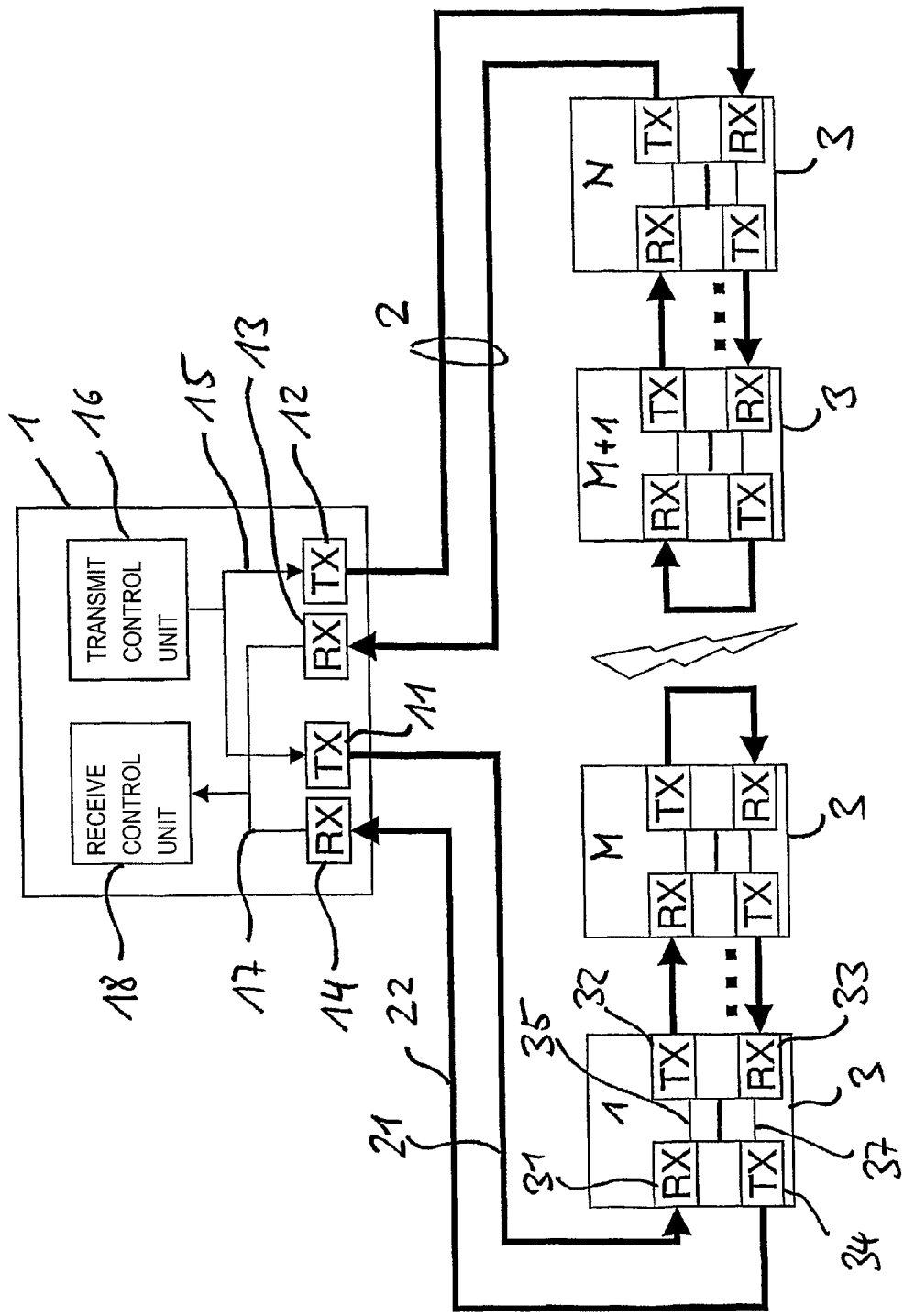
FIG. 1B represents a first communication system reconfiguration on the occurrence of a dual link fault.
Figure 1C:
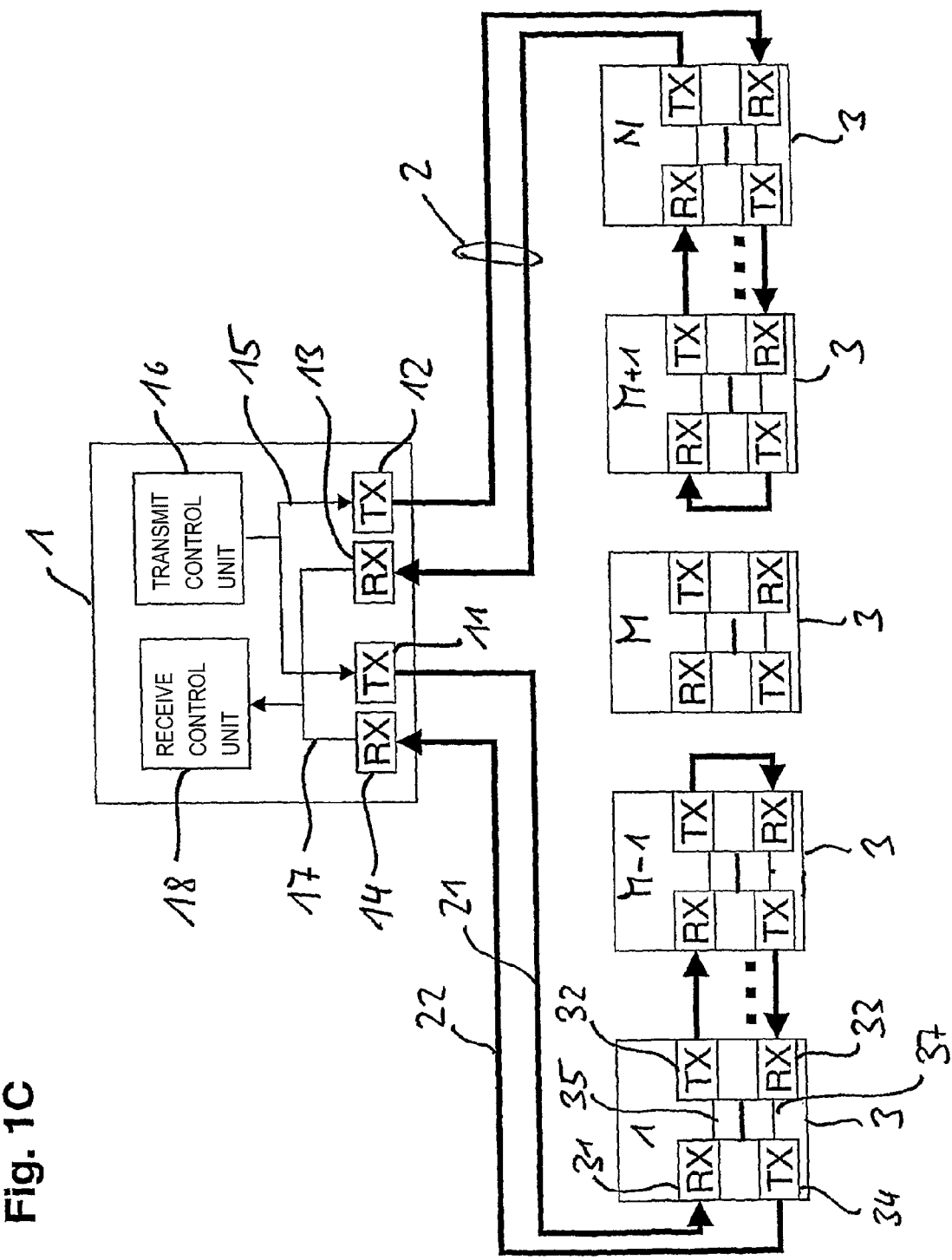
FIG. 1C represents a second communication system reconfiguration in the case of the failure of a slave unit.

FIG. 1B shows a dual link fault between the slave unit M and the slave unit M+1. FIG. 1C represents a complete failure of the slave unit M which is equivalent to the occurrence of two dual link faults, one between slave unit M−1 and the slave unit M and between the slave unit M+1 and the slave unit M. When such a dual link fault occurs, the coupling device 37, which can be activated, of the slave units 3 is driven in such a manner that the message arriving either on the first communication path 21 or the second communication path 22 is fed back to the master unit 1 on the other communication path in each case, the message first always passing through the processing unit 35 of the slave unit 3.

In the case of the dual link fault between the slave unit M and the slave unit M+1, shown in FIG. 1B, this occurs in such a manner that the slave units 1 to M−1 and M+2 to M are in normal operation whereas the slave units M and M+1 are reconfigured. In the fault case shown in FIG. 1C, in which the slave unit M completely fails, the slave units 1 to M−2 and the slave units M+2 to M are in normal operation. Slave units M−1 and M+1, in contrast, are reconfigured.

The reconfiguration is preferably triggered by the two ports 0 and 1 in the slave units 3. These two ports 0 and 1 detect by means of a known detection process whether the slave unit can communicate with an adjoining slave unit. If a link fault is detected by port 0 or port 1, a corresponding fault mode is then carried out and the coupling device 34 which can be activated, of the slave unit is driven in the desired manner.

In the case of a fault mode of port 1 as occurs in the dual link fault, shown in FIG. 1B, in the slave unit M and in the device failure, shown in FIG. 1C, in the slave unit M−1, the coupling device 37 which can be activated is driven in such a manner that the input of the processing unit 35 is coupled to the first receiving unit RX31 and the output of the processing unit 35 is coupled to the second transmitting unit TX34. The message circulating on the first communication path 21 is thus fed back to the second communication path 21 via the processing unit 35. In the case of the design of the coupling device 37 which can be activated, shown in FIG. 2, in the slave unit 3 with the first multiplexer 38 and the second multiplexer 39, this occurs in such a manner that the second input of the second multiplexer 39 is coupled to its output. The first multiplexer 38 remains in normal mode, in contrast.

In the case of a fault mode of ports 0 in the slave unit 3, i.e. when the first receiving unit RX31 and/or the second transmitting unit TX34 detect an interruption of the communication path to the adjacent slave unit which occurs in the case of the dual link fault, shown in FIG. 1B, in slave M+1 and in the device failure, shown in FIG. 1C, in slave M+1, the coupling device 34 which can be activated, in the slave unit 3 is driven in such a manner that the input of the processing unit 35 is coupled to the second receiving unit RX33 and the output of the processing unit 35 is coupled to the first transmitting unit TX32 so that the message passing through on the second communication path 22, after processing in the processing unit 35, is fed back to the master unit 1 on the first communication path 21. In the embodiment, shown in FIG. 2, of the coupling device 34 which can be activated, this occurs in such a manner that the first multiplexer 38 switches its second input to its output whereas the second multiplexer 39 remains in normal mode.

The procedure thus makes it possible to carry out reconfiguration measures in the communication system in a slave unit having only one processing unit, with the aid of a dual-ring structure and a coupling device which can be activated, in a simple manner in order to ensure the operability of the communication system in the case of a link fault, the behavior of the slave units with respect to message processing in the redundancy case not differing from that in normal mode.

Apart from the dual link fault shown in FIGS. 1B and 1C, in which the two communication paths to the adjacent user are interrupted, the procedure also enables single link faults, in which only one communication path is interrupted, to be detected and to maintain the operability of the communication system by correspondingly reconfiguring the users adjoining the fault location.

In the slave units 3, only one processing unit 35 is also always provided so that, in comparison with slave units having two processing units, no decision needs to be made about which processing unit is responsible for message processing.

To achieve a high fault tolerance of the communication system with low hardware expenditure, particularly also in the master unit 1, the processing of the messages circulating in opposite directions on the first communication path 21 and the second communication path 22 is carried out in such a manner that the processing during fault-free normal operation does not significantly differ from that in the case of a fault mode in which the operability of the communication system is maintained by reconfiguring the individual slave units in the case of link faults. The slave unit can be designed in that manner. However, the possibility also exists to use slave units having a different switching configuration which can be used as part of a master-slave system having a dual-ring structure.

The two messages received by the first receiving unit RX13 on the first communication path 21 and by the second receiving unit RX14 on the second communication path 22 in the master unit 1 are superimposed in the receive control unit 18 in order to thus produce a single message. This is done preferably by oring the useful data of the two messages bit by bit.

Furthermore, the messages in each case have in the control data area a counter field, the value of which is evaluated, preferably added together, in order to determine the operating state in the communication system, particularly the occurrence of a link fault. This is done in such a manner that the transmit control unit 16 of the master unit 1 transfers to the first transmitting unit TX11 and to the second transmitting unit TX12 in each case an identical message with a data field and a counter field, set to a predetermined value, for separately sending in opposite directions on the first communication path 21 and the second communication path 22. The processing unit 35 of each coupled slave unit 3 is also designed in such a manner that when the message passes through, the value of the counter field is altered by a predetermined value. In the receive control unit 18, the value of the counter field of the two messages received by the first receiving unit RX13 on the first communication path 21 and by the second receiving unit RX14 on the second communication path 22 is then in each case evaluated. From the values of the two counter fields, it is then possible to determine by simple addition whether all coupled slave units are active.

This is preferably done in such a manner that the counter field of the message is set to the value 0 in the case of sending in opposite directions and each processing unit 35, when the message passes through the slave unit 3, increments the value of the counter field by 1. Since due to the design of the users, only one message is ever processed by the processing unit both in normal operation and in fault mode with reconfiguration of the user circuit, the added value of the counter fields of the two messages fed back to the master unit 1 specifies the number of active users. It is thus possible to determine whether all coupled users are active or whether a total failure of one user has occurred, e.g. due to a double dual link fault as shown in FIG. 1C. In addition, it is possible to determine the precise position of the link fault, for example its occurrence between the slave unit M and slave unit M+1 in FIG. 1B, by comparing the values in the two counter fields, using the known number of coupled slave units as a basis.

A fault-tolerant operation of the communication system, particularly also in the case of a reconfiguration of the communication system by altering the course of the signal in the users on occurrence of a link fault, is also achieved due to the fact that the two identical messages circulating in opposite directions on the first communication path 21 and the second communication path 22 are designed in such a manner that in the useful data field, a data area is allocated to each coupled slave unit. The processing unit 35 of each slave unit 3 carries out a data exchange in the associated data area with the message passing through. In the receive control unit 18 of the master unit 1, the useful data fields of the two messages received by the first receiving unit RX13 on the first communication path 21 and by the second receiving unit RX14 on the second communication path 22 are then superimposed so that a common message is obtained. This superimposed message is always identical, regardless of whether the communication system is in normal operation or in fault mode on occurrence of a link fault, as long as all slave units 3 are still active.

In read mode, when the slave units 3 are intended to transmit data to the master unit 1, a message which is set to the value 0 in the entire useful data field is transferred by the transmit control unit 16 of the master unit 1 via the first control line 15 to the two transmit units TX11, TX12. The processing units 35 of the slave units 3 then write the desired data into the associated useful data areas. The receive control unit 18 of the master unit 1 subsequently ors the useful data fields of the two messages received by the first receiving unit RX13 on the first communication path 21 and by the second receiving unit RX14 on the second communication path 22 in order to form a common message. Regardless of whether the communication system is in normal mode or in reconfiguration mode, the stored message always contains all data of the coupled slave units 3 requested by the master unit 1.

In write mode, in contrast, when the master unit 1 wishes to transmit e.g. control commands to the slave units 3 via the first control line 15, the transmit control unit 16 of the master unit 1 transfers to the transmitting units TX11, TX12 a message having a useful data field which contains the data to be transmitted to the slave units 3 for simultaneous sending in opposite directions on the two communication paths 21, 22. The processing units 35 of the slave units 3 then extract the associated data from the message regardless of whether they are in normal mode or in reconfiguration mode. In principle, oring of the useful data fields of the two messages fed back to the master unit 1 and received by the first receiving unit RX13 and second receiving unit RX14 is no longer required. Such an oring process leads to a common message with a useful data field which corresponds to the useful data field of the message sent.

Given the design of the master-slave communication system, the possibility exists for the master unit, with an arbitrary arrangement of the individual slave unit, but particularly if the slave units are arranged and operated in that manner, to determine, in a simple manner, the freedom of faults in the communication system particularly also in the case of a reconfiguration of the course of the signal in the dual-ring structure after occurrence of a link fault. Furthermore, a reliable read and write operation is guaranteed in the communication system even in the redundant case, that is to say when individual users in the communication system have switched to fault mode, by superimposing the useful data field of the two messages fed back.

The preceding description describes advantageous exemplary embodiments. The features disclosed therein and the claims and the drawings can, therefore, be useful for realizing various embodiments, both individually and in any combination. While the foregoing is directed to specific embodiments, other and further embodiments may be devised without departing from the basic scope, the scope being determined by the claims that follow.

The invention claimed is:

1. A communication system comprising:
a multiplicity of slave units, the slave units being coupled to one another via a first communication path and a second communication path, the first communication path and the second communication path operating in opposite directions to one another; and
a master unit, the master unit being coupled to the multiplicity of slave units via the first communication path and the second communication path, the master unit comprising a transmit control unit and a receive control unit, wherein the communication system is operable in a read mode with the transmit control unit separately transmitting an information signal with a data field on the first communication path as a first information signal and on the second communication path as a second information signal, the receive control unit superimposing the data field of the first information signal circulated on the first communication path and the data field of the second information signal circulated on the second communication path by oring the data fields bit by bit;
wherein the data field comprises a separate data area for each slave unit, such that each slave unit has a respective data area to write data to be transmitted to the master unit when the information signal passes through the slave unit.

2. The communication system as claimed in claim 1, wherein the master unit comprises:
a first transmitting unit, the first coupled to the first communication path and transmitting information signals on the first communication path;
a second transmitting unit, coupled to the second communication path and transmitting information signals on the second communication path;
a first receiving unit coupled to the first communication path and receiving information signals on the first communication path; and
a second receiving unit coupled to the second communication path and receiving information signals on the second communication path;
wherein the transmit control unit is coupled to the first transmitting unit and the second transmitting unit, the transmit control unit, in the read mode of the master unit, transferring the information signal with the data field to the first transmitting unit and the second transmitting unit, the first transmitting unit transmitting the information signal on the first communication path as the first information signal and the second transmitting unit transmitting the information signal on the second communication path as the second information signal; and
wherein the receive control unit is coupled to the first receiving unit and the second receiving unit, the receive control unit, in read mode, superimposing the data fields of the first and the second information signals received by the first receiving unit on the first communication path and by the second receiving unit on the second communication path.

3. The communication system as claimed in claim 2, wherein the information signal transferred to the first transmitting unit and the second transmitting unit by the transmit control unit in the read mode comprises a data field set to the value 0, wherein the receive control unit, in the read mode, ores the data fields of the first and second information signals received by the first receiving unit and the first communication path and by the second receiving unit on the second communication path.

4. The communication system as claimed in claim 1, wherein each slave unit comprises:
a first receiving unit coupled to the first communication path and receiving information signals on the first communication path;
a first transmitting unit coupled to the first communication path and transmitting information signals on the first communication path;
a second receiving unit coupled to the second communication path and receiving information signals on the second communication path;
a second transmitting unit coupled to the second communication path and transmitting information signals on the second communication path;
a processing unit comprising an input and an output and processing information signals; and
a coupling device, in normal mode, connecting the input of the processing unit to the first receiving unit, the output of the processing unit to the first transmitting unit and the second receiving unit to the second transmitting unit, in fault mode of the first transmitting unit and/or of the second receiving unit, connecting the input of the processing unit to the first receiving unit and the output of the processing unit to the second transmitting unit, and in fault mode of the first receiving unit and/or of the second transmitting unit, connecting the input of the processing unit to the second receiving unit and the output of the processing unit to the first transmitting unit.

5. The communication system as claimed in claim 4, wherein in each slave unit, the coupling device comprises:
a first multiplexer, a first input of which is coupled to the first receiving unit, a second input of which is coupled to the second receiving unit and an output of which is coupled to the input of the processing unit; and
a second multiplexer, a first input of which is coupled to the second receiving unit, a second input of which is coupled to the output of the processing unit and an output of which is coupled to the second transmitting unit;
the first multiplexer connecting its first input to its output in normal mode and its second input to its output in fault mode of the first receiving unit and/or of the second transmitting unit, and the second multiplexer connecting its first input to its output in normal mode and its second input to its output in fault mode of the first transmitting unit and/or of the second receiving unit.

6. The communication system as claimed in claim 4, wherein in each slave unit, the first transmitting unit and the second transmitting unit and/or the first receiving unit and the second receiving unit detect a link fault on the corresponding communication path and initiating the fault mode.

7. The communication system as claimed in claim 4, wherein the transmit control unit of the master unit transfers to the first transmitting unit and the second transmitting unit the information signal having an additional counterfield set with a predetermined value, wherein the processing unit of each slave unit alters the value of the counterfield by a further predetermined value when the information signal passes through, and the receive control unit of the master unit in each case evaluates the value of the counterfields of the first and the second information signals received by the first receiving unit on the first communication path and by the second receiving unit on the second communication path.

8. The communication system as claimed in claim 7, wherein the receive control unit of the master unit adds the value of the counterfields of first and second information signals received by the first receiving unit on the first communication path and by the second receiving unit on the second communication path.

9. A master unit coupled to a first communication path and a second communication path, the first communication path and the second communication path operating in opposite directions to one another, the master unit comprising:
a transmit control unit and a receive control unit, wherein the master unit is operable in a read mode such that the transmit control unit separately transmits an information signal with a data field having bits being set to the value 0 on the first communication path as a first information signal and on the second communication path as a second information signal, the receive control unit superimposing the data field of the first information signal circulated on the first communication path and the data field of the second information signal circulated on the second communication path by oring the data fields bit by bit;
wherein the data field comprises a separately associated data area for each slave unit, such that each slave unit has a respective data area to write data to be transmitted to the master unit when the information signal passes through the slave unit.

10. The master unit as claimed in claim 9, further comprising:
- a first transmitting unit coupled to the first communication path for transmitting information signals on the first communication path;
- a second transmitting unit coupled to the second communication path for transmitting information signals on the second communication path;
- a first receiving unit coupled to the first communication path for receiving information signals on the first communication path; and
- a second receiving unit coupled to the second communication path for receiving information signals on the second communication path;
- wherein the transmit control unit is coupled to the first transmitting unit and the second transmitting unit, the transmit control unit, in the read mode of the master unit, transferring the information signal with the data field to the first transmitting unit and the second transmitting unit, the first transmitting unit transmitting the information signal on the first communication path as the first information signal and the second transmitting unit transmitting the information signal on the second communication path as the second information signal; and
- wherein the receive control unit is coupled to the first receiving unit and the second receiving unit, the receive control unit, in the read mode, superimposing the data fields of the first and the second information signals received by the first receiving unit on the first communication path and by the second receiving unit on the second communication path.

11. The master unit as claimed in claim 10, wherein the information signal transferred to the first transmitting unit and the second transmitting unit by the transmit control unit in the read mode has a the data field having bits set to the value 0, wherein the receive control unit, in the read mode, ores the data fields of the first and second information signals received by the first receiving unit and the first communication path and by the second receiving unit on the second communication path.

12. A user unit comprising:
- a first receiving unit coupled to a first communication path and receiving information signals on the first communication path;
- a first transmitting unit, coupled to the first communication path and transmitting information signals on the first communication path;
- a second receiving unit coupled to a second communication path and receiving information signals on the second communication path;
- a second transmitting unit coupled to the second communication path and transmitting information signals on the second communication path; a processing unit comprising an input and an output and processing information signals passing through via the input and the output, the processing unit exchanging data allocated to the user unit with the information signals, and in a read mode, the processing unit writing data to be transmitted to a master unit into a data area separately associated with the user unit in each information signal passing through the user unit; and
- a coupling device, in a normal mode, connecting the input of the processing unit to the first receiving unit, the output of the processing unit to the first transmitting unit and the second receiving unit to the second transmitting unit, in a fault mode of the first transmitting unit and/or of the second receiving unit, connecting the input of the processing unit to the first receiving unit and the output of the processing unit to the second transmitting unit, and in a fault mode of the first receiving unit and/or of the second transmitting unit, connecting the input of the processing unit to the second receiving unit and the output of the processing unit to the first transmitting unit.

13. The user unit as claimed in claim 12, wherein the coupling device comprises:
- a first multiplexer, a first input of which is coupled to the first receiving unit, a second input of which is coupled to the second receiving unit and an output of which is coupled to the input of the processing unit; and
- a second multiplexer, a first input of which is coupled to the second receiving unit, a second input of which is coupled to the output of the processing unit and an output of which is coupled to the second transmitting unit;
- the first multiplexer connecting its first input to its output in normal mode and its second input to its output in fault mode of the first receiving unit and/or of the second transmitting unit, and the second multiplexer connecting its first input to its output in normal mode and its second input to its output in fault mode of the first transmitting unit and/or of the second receiving unit.

14. The user unit as claimed in claim 12, wherein the first transmitting unit and the second transmitting unit and/or the first receiving unit and the second receiving unit detect a link fault on the corresponding communication path and initiating the fault mode.

15. The user unit as claimed in claim 12, being a slave unit in communication system having a master-slave structure with a multiplicity of slave units, the slave units being coupled serially to a master unit via a dual-ring structure formed by the first communication path and the second communication path, the first communication path and the second communication path operating in opposite directions.

16. A method of operating a communication system having a master-slave structure, wherein slave units are coupled serially to a master unit via a dual-ring structure formed by a first communication path and a second communication path, the first communication path and the second communication path operating in opposite directions, wherein the communication system is operable in a read mode such that the master unit separately transmits an information signal with a data field on the first communication path as a first information signal and on the second communication path as a second information signal, wherein the data field has a separately associated data area for each respective slave unit, such that each slave unit has a respective data area to write data to be transmitted to the master unit when the information signal passes through the slave unit, and wherein the master unit superimposes the data field of the first information signal circulated on the first communication path and the data field of the second information signal circulated on the second communication path by oring the data fields bit by bit.

17. The method as claimed in claim 16, wherein the information signal has a data field set to the value 0, wherein the master unit, ores the data fields of the first and second information signals received on the first communication path and the second communication path.

18. The method as claimed in claim 16, wherein the master unit transfers the information signal having an additional counterfield set with a predetermined value, wherein each slave unit changes the value of the counterfield by a further predetermined value when the information signal passes through, and the master unit in each case evaluates the value of the counterfields of the first and second information signals received on the first communication path and the second communication path.

19. The method as claimed in claim 18, wherein the master unit adds together the value of the counterfields of the first and second information signals received on the first communication path and the second communication path.

20. The method as claimed in claim 16, wherein each slave unit comprises:
- a first receiving unit coupled to the first communication path and receiving information signals on the first communication path;
- a first transmitting unit coupled to the first communication path and transmitting information signals on the first communication path;
- a second receiving unit coupled to the second communication path and receiving information signals on the second communication path;
- a second transmitting unit coupled to the second communication path and transmitting information signals on the second communication path;
- a processing unit comprising an input and an output and processing information signals; and
- a coupling device, in normal mode, connecting the input of the processing unit to the first receiving unit, the output of the processing unit to the first transmitting unit and the second receiving unit to the second transmitting unit, in fault mode of the first transmitting unit and/or of the second receiving unit, connecting the input of the processing unit to the first receiving unit and the output of the processing unit to the second transmitting unit, and in fault mode of the first receiving unit and/or of the second transmitting unit, connecting the input of the processing unit to the second receiving unit and the output of the processing unit to the first transmitting unit.

21. The method as claimed in claim 20, wherein in each slave unit, the first transmitting unit and the second transmitting unit and/or the first receiving unit and the second receiving unit detect a link fault on the corresponding communication path and initiating the fault mode.

22. The method as claimed in claim 16, controlling and regulating a multiplicity of servomotors.

23. A method of operating a user unit comprising:
- a first receiving unit coupled to a first communication path and receiving information signals on the first communication path;
- a first transmitting unit coupled to the first communication path and transmitting information signals on the first communication path;
- a second receiving unit coupled to a second communication path and receiving information signals on the second communication path;
- a second transmitting unit coupled to the second communication path and transmitting information signals on the second communication path; and
- a processing unit comprising an input and an output and processing information signals passing through via the input and the output, the processing unit exchanging data allocated to the user unit with information signals, wherein in a read mode, the processing unit writes data to be transmitted to a master unit into a data area separately associated with the user unit in each information signal passing through the user unit;
- wherein in a normal mode, the input of the processing unit is connected to the first receiving unit, the output of the processing unit is connected to the first transmitting unit and the second receiving unit is connected to the second transmitting unit, wherein, in a fault mode of the first transmitting unit and/or of the second receiving unit, the input of the processing unit is connected to the first receiving unit and the output of the processing unit to the second transmitting unit, and wherein, in a fault mode of the first receiving unit and/or of the second transmitting unit, the input of the processing unit is connected to the second receiving unit and the output of the processing unit is connected to the first transmitting unit.

24. The method as claimed in claim 23, wherein the first transmitting unit and the second transmitting unit and/or the first receiving unit and the second receiving unit detect a link fault on the corresponding communication path and initiating the fault mode.

25. The method as claimed in claim 23, wherein the user unit is a slave unit in communication system having a master-slave structure with a multiplicity of slave units, the slave units being coupled serially to a master unit via a dual-ring structure formed by the first communication path and the second communication path, the first communication path and the second communication path operating in opposite directions.

26. A method of operating a communication system having a master-slave structure, wherein slave units are coupled serially to a master unit via a dual-ring structure formed by a first communication path and a second communication path, the first communication path and the second communication path operating in opposite directions, wherein the master unit separately transmits an information signal with a data field on the first communication path as a first information signal and on the second communication path as a second information signal, wherein the data field comprises a separately associated data area for each slave unit, such that each slave unit has a respective data are to write data to be transmitted to the master unit when the information signal passes through the slave unit, and the master unit superimposes the data field of the first information signal circulated on the first communication path and the data field of the second information signal circulated on the second communication path, and wherein the master unit transfers the information signal having an additional counterfield set with a predetermined value, and wherein each slave unit changes the value of the counterfield by a further predetermined value when the information signal passes through, and the master unit in each case evaluating the value of the counterfields of the first and second information signals received on the first and second communication paths.

27. The method as claimed in claim 26, wherein the master unit adds together the value of the counterfields of the first and second information signals received on the first communication path and the second communication path.

* * * * *

UNITED STATES PATENT AND TRADEMARK OFFICE
CERTIFICATE OF CORRECTION

PATENT NO. : 8,055,826 B2  
APPLICATION NO. : 11/911173  
DATED : November 8, 2011  
INVENTOR(S) : Dirk Janssen et al.

Page 1 of 1

It is certified that error appears in the above-identified patent and that said Letters Patent is hereby corrected as shown below:

SPECIFICATION

| Column | Line | PTO | Should Read |
|---|---|---|---|
| 1 | 11 | 10 2005 016 596.6 | -- 10 2005 016 596.6, filed 11 April 2005, the subject matter of which are hereby incorporated by reference in its entirety. -- |

CLAIMS

| Column | Line | PTO | Should Read |
|---|---|---|---|
| 11 | 6 | transmitting unit, the first coupled | transmitting unit coupled |
| 11 | 9 | transmitting unit, coupled | transmitting unit coupled |
| 13 | 42 | transmitting unit, coupled | transmitting unit coupled |
| 16 | 52 | through, and the master unit | through, the master unit |

Signed and Sealed this  
Thirty-first Day of January, 2012

David J. Kappos  
*Director of the United States Patent and Trademark Office*